(12) United States Patent
Dittrich

(10) Patent No.: US 9,697,050 B2
(45) Date of Patent: *Jul. 4, 2017

(54) SYSTEM AND METHOD FOR SCALING FOR A LARGE NUMBER OF CONCURRENT USERS

(75) Inventor: Wolfgang Dittrich, Heidelberg (DE)

(73) Assignee: SAP SE, Walldorf (DE)

( * ) Notice: Subject to any disclaimer, the term of this patent is extended or adjusted under 35 U.S.C. 154(b) by 249 days.

This patent is subject to a terminal disclaimer.

(21) Appl. No.: 12/976,175

(22) Filed: Dec. 22, 2010

(65) Prior Publication Data

US 2012/0166481 A1   Jun. 28, 2012

(51) Int. Cl.
| | |
|---|---|
| G06F 7/00 | (2006.01) |
| G06F 9/50 | (2006.01) |
| G06F 17/30 | (2006.01) |
| H04L 29/08 | (2006.01) |

(52) U.S. Cl.
CPC ........ G06F 9/505 (2013.01); G06F 17/30893 (2013.01); H04L 67/142 (2013.01); H04L 67/146 (2013.01)

(58) Field of Classification Search
CPC .................................................. G06F 17/30893
USPC ................................................. 707/786, 609
See application file for complete search history.

(56) References Cited

U.S. PATENT DOCUMENTS

| | | | |
|---|---|---|---|
| 5,699,500 A | | 12/1997 | Dasgupta |
| 5,875,296 A | * | 2/1999 | Shi ......................... G06F 21/41 726/5 |
| 6,330,653 B1 | * | 12/2001 | Murray et al. ................ 711/173 |
| 6,954,220 B1 | * | 10/2005 | Bowman-Amuah ......... 715/741 |
| 7,100,195 B1 | * | 8/2006 | Underwood .......... G06F 9/4443 707/999.009 |
| 7,206,805 B1 | * | 4/2007 | McLaughlin, Jr. ..... G06F 9/466 707/999.01 |
| 7,290,056 B1 | * | 10/2007 | McLaughlin, Jr. . H04L 43/0852 709/201 |

(Continued)

OTHER PUBLICATIONS

Brantner, M. et al., "Building a database in the cloud", Internet citation, Oct. 16, 2009, XP002649174, pp. 1-49.

(Continued)

Primary Examiner — Eliyah S Harper
(74) Attorney, Agent, or Firm — Jones Day

(57) ABSTRACT

Disclosed embodiments provide a system, machine-readable medium and a method that may generate a session identification for a user session of each of a plurality of users of the computer application. Cookies related to users may be retrieved from external storage using the session identification. A user context may be restored using the retrieved cookies. Functional computing logic may be called based on the restored user context. A state representation may be assembled according to data in a database. Upon completion of functions performed by the called functional computing logic, the user context and the assembled state representation may be stored as a cookie for each of users in external storage. Based on the assembled state representation, user context, and data from the accessed database, HTML code may be generated. Stateful function computing logic may be re-used by employing stateless implementations of consistency frameworks which may include lock management and update task handling performing the actual database changes.

15 Claims, 5 Drawing Sheets

(56) References Cited

U.S. PATENT DOCUMENTS

| | | | |
|---|---|---|---|
| 7,945,637 B2* | 5/2011 | Van Vleet | G06F 17/30867 707/705 |
| 8,239,445 B1* | 8/2012 | Gage | H04L 29/06 709/203 |
| 2004/0181598 A1* | 9/2004 | Paya | G06F 17/30902 709/227 |
| 2005/0015601 A1* | 1/2005 | Tabi | G06F 21/6227 713/182 |
| 2006/0155857 A1* | 7/2006 | Feenan, Jr. | G06F 17/30902 709/227 |
| 2006/0167960 A1* | 7/2006 | Lomet | 707/206 |
| 2007/0198698 A1* | 8/2007 | Boyd | G06F 17/30902 709/224 |
| 2008/0109037 A1* | 5/2008 | Steiner | A61B 17/0401 606/232 |
| 2009/0249310 A1 | 10/2009 | Meijer et al. | |
| 2011/0040826 A1* | 2/2011 | Chadzelek | H04L 67/02 709/203 |

OTHER PUBLICATIONS

Song, Xiang et al., "State management in web services", Distributed Computing Systems, May 26, 2004, Proceedings, FTDCS 2004, 10th IEEE International Workshop on Future Trends of Suzhou, China, pp. 21-27.

EP Search Report for application No. 11194610.9, dated Jun. 19, 2012.

* cited by examiner

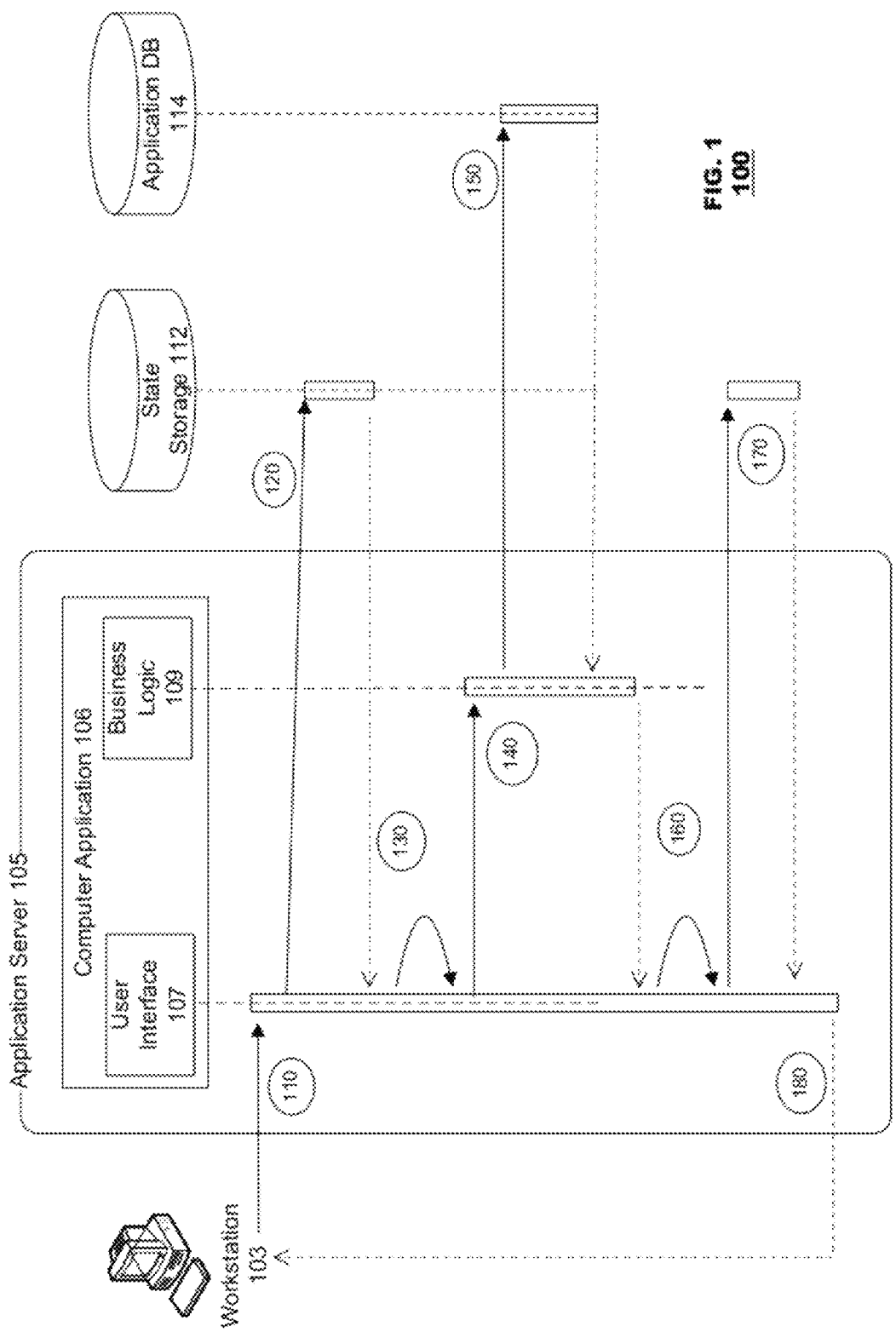

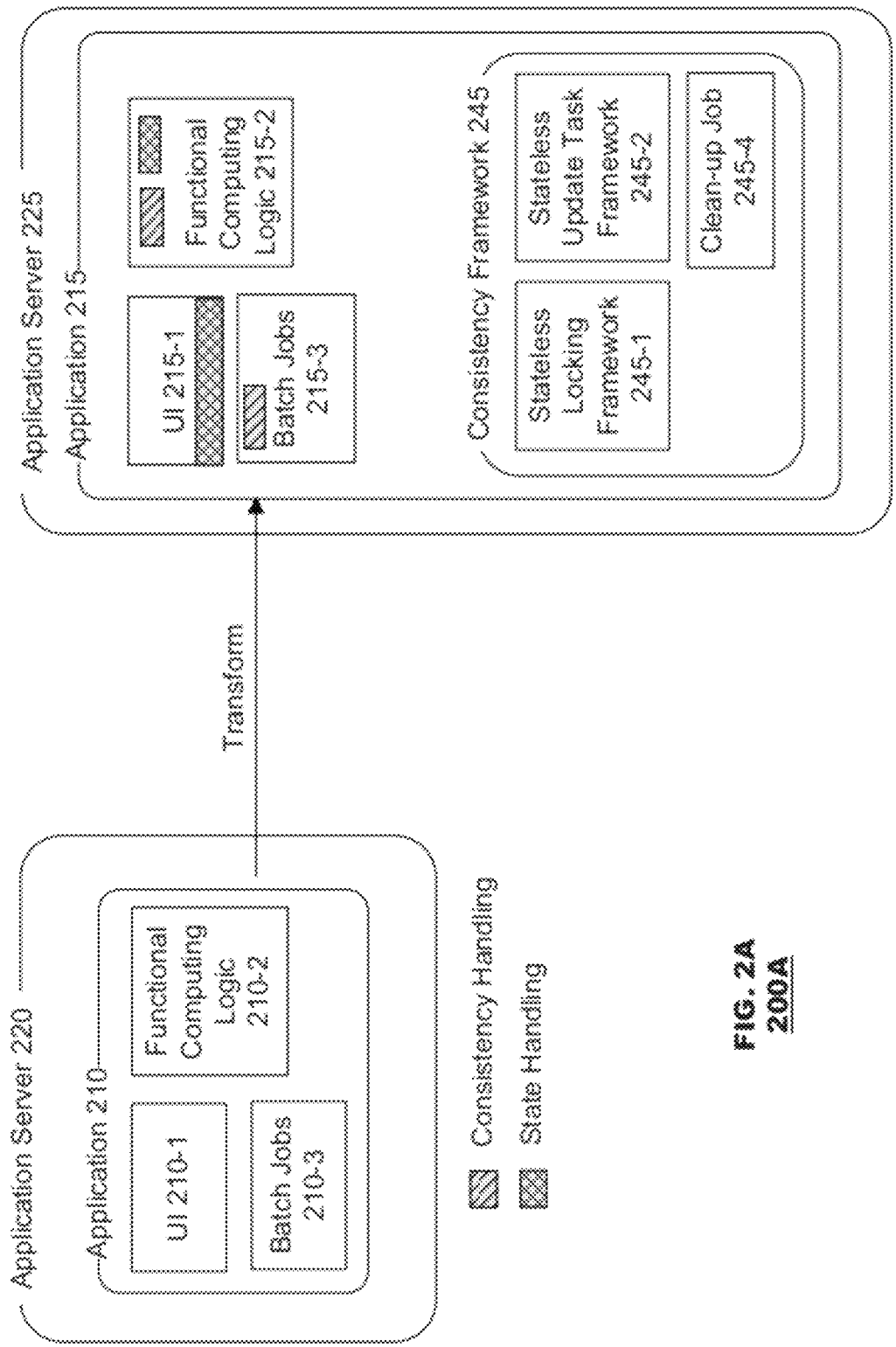

200B

SYSTEM AND METHOD FOR SCALING FOR A LARGE NUMBER OF CONCURRENT USERS

BACKGROUND

The disclosed subject matter relates to a system and method for scaling of a computer system of limited hardware resources from a small number of concurrent users to a large number of concurrent users. In particular, the disclosed subject matter relates to a software architecture for scaling to a large number of concurrent users using limited hardware resources by transforming the state management and consistency handling of traditional computer programs, such as ABAP™ programs.

Certain computer applications, such as SAP® ABAP™ applications, are "stateful" applications in which a state of a user session is maintained as a collection of user-specific session variables in main memory of the application server. The set of user-specific session variables may even be unique to the specific session. Stateful applications are efficient and provide excellent performance when there are a known, or at least predictable, number of concurrent users allowing appropriate HW sizing. In those situations, stateful applications handle in particular very high frequent requests of relatively short duration which might even operate on very large sessions with great efficiency. However, in environments such as cloud computing and software-as-a-service, where the number of concurrent users can range from a few to many, and is typically an unknown quantity, stateful applications may not provide the same efficiency and may lack performance due to the memory constraints. Also, the user sessions in cloud computing and software-as-a-service provided activities may typically experience rather infrequent requests (i.e. long think times), so the user session reserves unutilized computing resources for a longer period of time, which can contribute to the congestion and inefficient use of computing and memory resources.

Computer applications that are "stateless" are better suited for use in the cloud computing and software-as-a-service environment. A stateless application is a computer application that does not allocate dedicated main memory of the application server for maintaining the state of a user session (in between user requests), but rather uses external storage, such as a database, to maintain the state of a user session in a persistent memory. It would be beneficial if stateful applications could be transformed into stateless applications to take advantage of a "cloud computing" environment.

The inventor realized these benefits and developed a solution for transforming the stateful applications to stateless applications thereby permitting the stateful application to scale to use with a large number of concurrent users and handle sessions with longer delays between consecutive requests more efficiently.

BRIEF DESCRIPTION OF THE DRAWINGS

FIG. 1 illustrates an exemplary stateless pattern for transforming stateful computer applications to stateless computer applications according to an exemplary embodiment.

FIGS. 2A and 2B illustrate exemplary component diagrams of software frameworks in an application environment and a server environment, respectively, for scaling a computer system to a large number of concurrent users according to an exemplary embodiment.

DETAILED DESCRIPTION

Figure 2B:
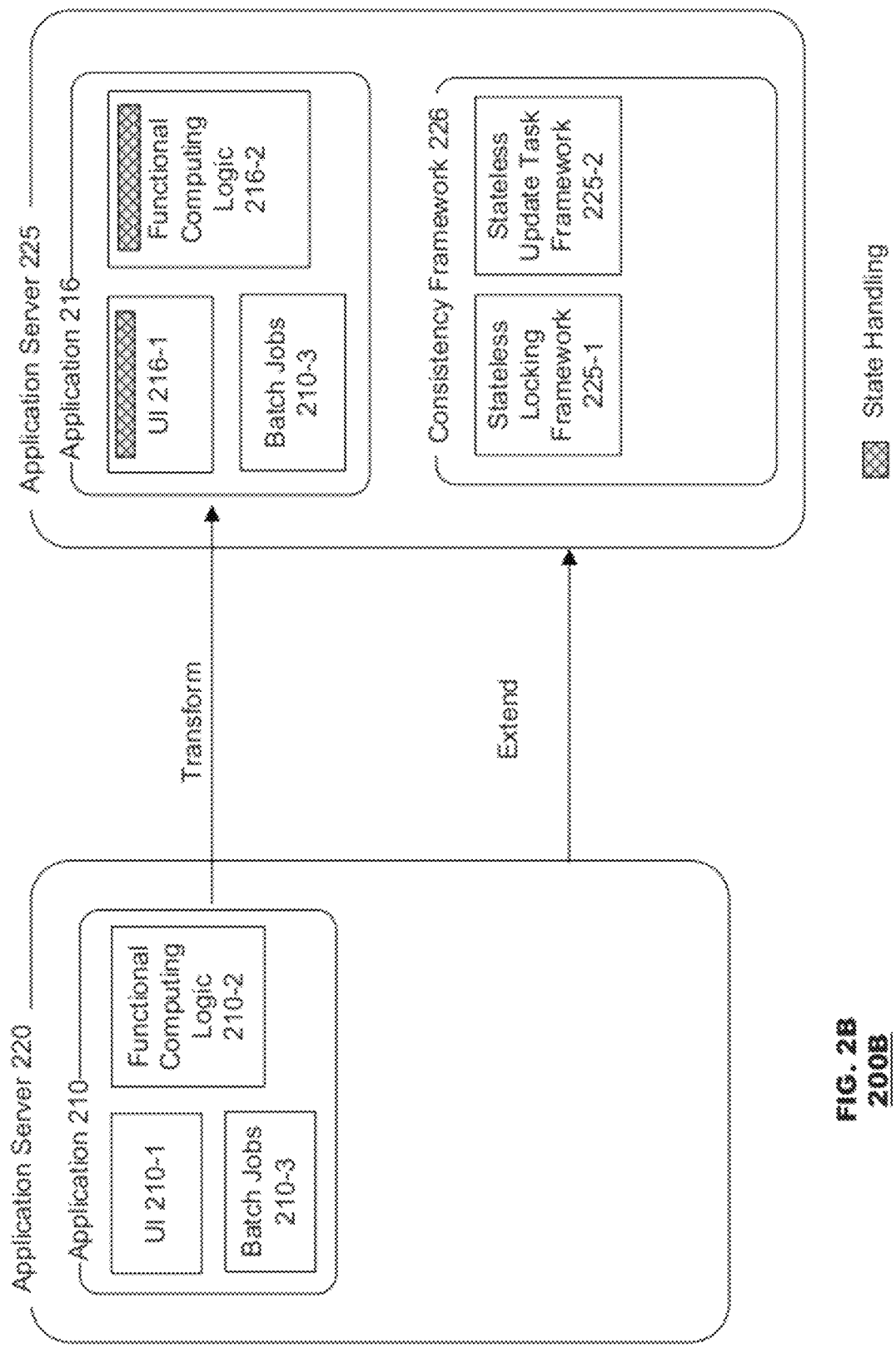

Embodiments may take existing stateful web-based applications, such as ABAP applications, and transform them into a stateless application by applying a combination of techniques, such as stateless consistency handling, and manual state management pattern, to web applications and batch jobs, respectively.

Described herein are embodiments of a system, a machine-readable storage medium, and a method for transforming a stateful computer application to a stateless application so a large number of concurrent users may use limited hardware resources. In an exemplary method, a processor may generate a session identification for a user session of each of a plurality of users of the computer application. Cookies related to each of the plurality of users may be retrieved from external storage using the session identification (ID). A user context may be restored for each of the plurality of users of the computer application by using the retrieved cookies. The user context may be the "main memory content" that the application uses to process a request, and includes local data structures, user input, caches, and perhaps related database information. Functional computing logic, also referred to as business logic, may be called based on the restored user context. A state representation subset of the user context may be assembled afterwards. The state representation may be the portions of the user context that are sufficient to recreate the full user context. The state representative may be understood as a compressed version of the user context. Upon completion of functions performed by the called functional computing logic, the assembled state representation may be stored as a cookie for each of the plurality of users in external storage, in which case, the session ID may be a primary key. Based on the user context, and data from the accessed database, HTML code may be generated by a user interface layer.

Embodiments may provide a system that may include a user terminal, a database, and an application server. The user terminal may receive inputs and output data. The database may store data. The application server may have a processor configured to generate a session identification for a user session of each of a plurality of users of the computer application. The processor may retrieve cookies related to each of the plurality of users from external storage using the session identification. A user context for each of the plurality of users of the computer application may be restored by using the retrieved cookies. Functional computing logic may be called based on the restored user context. A state representation subset of the user context may be assembled by the processor. Upon completion of functions performed by a processor according to the called functional computing logic, the assembled state representation may be stored as a cookie for each of the plurality of users in external storage. When storing the assembled state representation, the session ID may be a primary key. Based on the user context, and data from the accessed database, HTML code may be generated by a user interface.

Also, described embodiments provide a machine-readable storage medium embodying computer program instructions for implementing a method for transforming a stateful computer application to a stateless application so a large number of concurrent users may use limited hardware resources.

Terms used in the disclosure include: "State storage" that may refer to persistent storage that holds the server side cookies; an "application database" that may refer to the database (DB) used as persistence storage of the application; a "user context", such as in ABAP applications, may include system variables and application variables (e.g. global and static variables); a "state representation" may be a subset of the full user context that is sufficient to rebuild the user context; and a "dialog step" may be a single request by the system to a user. It should be understood that the claimed embodiments may refer to any web application executing on a server, but, for ease of explanation, reference to a specific example of an ABAP application executing on a server, such as an ABAP server, may be made. Other examples include two tier applications which may be converted into Rich Internet Application (RIA) internet applications by separating UI from computation logic tier so that the UI tier runs in the browser and the computation logic tier runs on the application server. These applications may employ programming environments like Microsoft .Net and Java. Functional computing logic, or business logic, may be executed by a processor to provide a specific operator on data and may encompass any number of processes, such as invoicing, accounting, human resources and the like.

A stateless pattern may refer to stateless request processing performed on a server, such as an ABAP server. Stateless request processing may occur when a computer application that does not allocate main memory, but rather may use external storage, such as a database, to maintain the state of the user session in persistent memory in between dialog steps. In addition, the term "stateless" may mean that resources on the server are blocked or reserved only while the request is actually processed. After the server finishes the request processing (i.e. a response is sent to the client), all resources, in particular, the user context may be freed or returned for reuse with other requests.

FIG. 1 illustrates an exemplary application of a stateless pattern for transforming stateful computer applications to stateless computer applications according to an exemplary embodiment. In order to overcome deficiencies with respect to scaling of the stateful application, both the method for maintaining the user state and the method for consistency handling (e.g. Enqueue locks and update tasks) may require transformations to operate as a stateless application. As illustrated in the stateless pattern of FIG. 1, different actions may take place to accomplish the transformations.

The working principle of the stateless pattern is illustrated in FIG. 1. The implementing computer system may include an application server 105, a state storage 112 and an application database (DB) 114. The application server 105 may include a computer application 106. The computer application 106 may include a user interface (UI) layer 107 and a functional computing logic layer 109. The user interface layer 107 may cause a graphical user interface to be presented on a workstation 103. The respective layers 107 and 109 may include modules containing software code executable by a processor in workstation 103. In the process 100 of FIG. 1, a request issued from a browser under control of a processor executing on a workstation 103 may be received by the UI layer 107 at step 110. The request may include data related to the user (e.g., password, logon ID, and the like). The functional computing logic layer 109 may be executable code related to a functional computer process such as invoicing, human resources management and/or the like. However, the functional computing logic layer log can be related to any suitable process, such as file management.

The process 100 may authenticate the user via the UI layer 107 executing on the computer processor, and generate a session ID. The session ID may be generated by a UI framework (e.g. the Business Server Pages (BSP) application framework) executing on the application server 105 and in combination with processing at the UI layer 107. The processor executing the UI layer 107, using the session ID, may retrieve at step 120 cookies associated with the data of the session ID from, for example, the state storage 112. The state storage 112 may be any data storage capable of storing the server side cookies and accessible by the processor. Since the user session ID may be a small amount of data and may be easily passed between functions within the application server 105, the user session ID may be used as a primary key when storing the cookie in state storage 112.

The processor may use the UI layer 107 to restore a user context (or state) from a state representation derived from the cookies. As mentioned above, the user context may be made up of system and application variables. Since system variables (SY variables) may not be set by the application directly, the components of the application (functional computing logic layer 109 or user interface layer 107) that may use the SY variable may be configured to utilize the respective SY variables on a case-by-case basis. Furthermore, since most SY variables are only consumed during a single dialog session, the likelihood of errors related to them is rather low.

At step 130, based on the state representation stored in the retrieved cookie, the functionality of the UI layer 107 may cause the processor to restore the user context by setting all necessary static variables of the function modules, the global variables, and the like, related to the authenticated user. The functional computing logic 109 may be called at step 140 using the restored user context.

At step 150, the functional computing logic 109 may cause the processor to access the application database 114 and/or may set or release locks based on the data requested for use by the workstation 103. Locks may managed by a lock manager, e.g. the SAP Enqueue server. The application database 114 may contain a lock storage, e.g. a database table, operated on by a lock manager that maintains the status of all locks for each session. After the functional computing logic 109 has completed retrieving data, at step 160, the functionality of UI layer 107 may cause the processor to assemble a state representation of the current user session. After the state representation is assembled, at step 170, the user context may be stored as a cookie in the state storage 112. At step 180, the UI 107 may generate the HTML containing the data requested by the workstation 103 for rendering by the browser on the workstation 103. The UI 107 may use the restored user context when generating the HTML for rendering by the browser.

The first step in transforming a stateful application into a stateless application may be to regroup the structure such that it complies with the stateless pattern. Regrouping may require modification of the functional computing logic 109 and user interface 107 layer. In addition, new coding for steps 120, 130, 160 and 170 may be added to manage the state (by applying the state management pattern). As illustrated in FIG. 1, a computer application 106 may be conceptually split into a user interface 107 and functional computing logic 109. Manual state management may comprise two phases: phase 1 and phase 2. During phase 1 (comprising steps 110-140 of FIG. 1), the user context may be restored from a condensed state representation read from, for example, external state storage 112 such that the functional computing logic 109 can be called basically unchanged. During phase 2 (steps 160-170 of FIG. 1), the condensed state representation may be assembled using the user context and persisted (e.g. saved) on the external state storage 112. The session ID may be used to identify the state representation on the external storage 112 in both cases.

The following provides a more detailed explanation of the transformation in the application 106 with reference to FIG. 2A. FIG. 2A illustrates an exemplary component diagram of a software framework in an application environment for scaling a computer system to a large number of concurrent users according to an exemplary embodiment. The computer application 210 executing on a computer processor may include two software layers: a user interface (UI) layer 210-1 and a functional computing logic (FL) layer 210-2. The computer application 210 may also generate batch jobs 210-3. The UI layer 210-1 may generate HTML pages which may be rendered (directly or indirectly using, for example, a plug-in) by a browser on a client. The HTML pages may be created based on a server-side programming model within the framework of a stateless computer application 210, such as a business server pages (BSP) application framework.

The computer application 210 may be a stateless application that may include the following components: pages, page fragments, navigation structure, application class, MIME objects, a topic, and/or other features. A topic may be a predefined content category used for classifying and targeting content, and for user subscription. Stateless business server pages may also process HTTP requests in a stateless fashion. The computer application 210 may generate a HTML page, and the HTML page in a specific example may also be considered a component of a business server page application. The generated HTML page may include a layout part, event handlers, as well as page attributes and type definitions. In some embodiments, the computer application 210 may be any form of web application that may utilize a HTTP request handler, such as CL_BSP_EXTENSION. For example, the web application may be a portal, an online shop, or the like. A basis for the technique "stateless pattern" in an ABAP server may be the utilization of stateless request processing of business server pages.

The computer system of FIG. 2A may include, in a stateful condition, the application server 220, which may host computer application 210. However, when transformed, the application 210 may include additional data and executable code. For example, a transformed application 215 may include a transformed user interface (UI) 215-1, transformed functional computing logic 215-2 and transformed batch job 215-3. Furthermore, the application server 220 may run a consistency framework 245 that may include stateless locking framework 245-1 and stateless update task framework 245-2 in order to support the consistency handling of the transformed application. In addition, a clean up job 245-4 may remove data of no longer active sessions from an external storage used by consistency frameworks and/or from the state storage.

The UI 215-1 of the transformed application may be stateless, and may interact with an application, such as a BSP application. The UI 215-1 may also include additional functionality provided by additional executable code that provides state handling. The state of, for example, the BSP application belonging to the UI 215-1 may be included as part of the state representation as well. The batch jobs 215-3 of the transformed application 215 may also include additional functionality for maintaining consistency handling. Similarly, the functional computing logic 215-2 of the transformed application 215 may include additional functionality for both consistency handling and state handling.

In order to apply the state management pattern (which may apply to steps 120, 130, 160 and 170 of FIG. 1), manual changes to the to-be-transformed application may be made. Additional coding in order to retrieve the state representation (phase 2) and recreate the context from the state representation (phase 1) may be added to the functional computing logic 215-2. This coding is then called (e.g., during steps 130 and 160 of FIG. 1) to retrieve and set the context, respectively. For example, methods to serialize the internal state of an object plus special constructors to recreate those objects from the serialized data may be added to classes and/or functional groups so function modules may retrieve/set the state of function groups (i.e., variables with scope function group).

In the transformed application 215, only minor modifications may be needed to the way the locks are handled, for example, at step 140. These modifications may be replacements of, for example, SAP Enqueue lock calls with calls to semantically compatible functions provided by the stateless locking framework.

The stateless locking framework 245-1 may provide substitutes for all existing functions, in particular the functions trying to set a lock (e.g., S_ENQUEUE instead of ENQUEUE provided by the SAP application server), remove a lock (e.g., S_DEQUEUE instead of DEQUEUE) and remove all locks of a giving session (e.g., S_DEQUEUE_ALL instead of DEQUEUE_ALL) may have substitutes. Each of the above functions—in addition to the parameters of the original function—may include the new parameter LUW_ID. A LUW is a logical unit of work, and may be active for the span of time during which any transaction is updated in an all-or-nothing manner. For example, the session ID may be used as the LUW_ID. The session ID can be retrieved from, for example, a BSP application executing on application server 215 using, for example, a RUNTIME object where (RUNTIME→session-id).

The implementation of the stateless locking framework may include a lock manager and a lock storage. The lock storage may be a database table with a compound primary key consisting of a computer name, a LUW_ID, and a timestamp. The timestamp may contain the point in time when the lock was set and the computer name and unique identification of the application server calling the stateless locking framework. With this data structure, all locks associated with a user session can be easily identified by means of the common LUW_ID. In addition locks may be selected based on time and by which computer they were set. The asynchronous behavior of the stateless locking framework 245-1 may be implemented, for example, by using asynchronous remote function calls.

In the transformed application 215, the manner in which update tasks are handled may be modified at step 140 of FIG. 1. Therefore, the stateless update task framework 245-2 may provide compatible substitutes for the following functions:
CALL FUNCTION . . . IN UPDATE TASK—If a function module is called, for example, using this statement, the function module may be flagged for execution using a special update work process.
PERFORM ON COMMIT—This statement may be used, for example, to call a subroutine in the dialog work process.
CALL FUNCTION . . . IN BACKGROUND TASK DESTINATION—Function modules called using this statement may, for example, be registered for background execution in another system, such as an SAP system, when the program reaches the next COMMIT WORK statement (using, for example, a Remote Function Call).

PERFORM ON COMMIT—This statement may, for example, call a subroutine in the dialog work process on COMMIT WORK.

PERFORM ON ROLLBACK—This statement may call a subroutine in the dialog work process on ROLLBACK.

SET UPDATE TASK LOCAL—This statement if called before any of the statements above may cause the execution of the statements at COMMIT WORK to be done by the current work process.

A general idea of the stateless update task framework may be, instead of executing the above statements directly, their execution may be deferred to a later point in time (which may be determined by the application 215 logic) by queuing the statements in a specific database table (the update task storage). The queued statements may be maintained in the update task storage, like a database table, for the entire user session, not just a single dialog step. The task of queuing and replaying these statements may be managed by the stateless update task framework 245-2. The point in time when the replay or cancel is triggered may be determined by executing a COMMIT WORK or ROLLBACK WORK statement within the application 215 logic. Specifically, instead of calling, for example CALL FUNCTION IN UPDATE TASK (and the other statements) directly, the stateless update task framework 245-2 may be called. The stateless update task framework 245-2 may store the name of the function and the value of all its parameters using the session key as the primary key in a persistent queue. In addition before each COMMIT WORK or ROLLBACK WORK statement, a call to the stateless update task framework 245-2 to replay or cancel the queued statements, respectively, may be inserted. Canceling the queued statements can be simplified by registering a subroutine with PERFORM ON COMMIT and PERFORM ON ROLLBACK before step 140 of the stateless pattern illustrated in FIG. 1. This subroutine may call the stateless update task framework 245-2 to trigger the appropriate action.

When, for example, a COMMIT WORK is called, the stateless update task framework 245-2 may retrieve all queued statements, and may execute them one by one. In case of a ROLLBACK WORK, memorized statements may be removed from the stateless update task framework 245-2 queue. In order to simplify the implementation of the framework queue and to avoid another background task clearing the database entries, data storage such as state storage 112 of FIG. 1 that stored the server side cookies may be used.

When a new task is begun by a process, a statement, such as a CALL FUNCTION STARTING NEW TASK statement may be called. The statement CALL FUNCTION STARTING NEW TASK may only be indirectly affected by the stateless pattern. Only in the case in which callbacks are used may a code modification be required. For example, callbacks may not work after the dialog step in which the CALL FUNCTION STARTING NEW TASK is executed has ended. Hence the statement WAIT_UNTIL may be added before the end of the dialog step in the stateful application, in order to sync with the asynchronously called functions.

In a situation where two (or more) remote function calls to the same function module instance are to be executed in different dialog steps, and each of the different dialog steps expect stateful behavior on the receiving side, the application server 225 may have to address the remote function calls to insure proper execution of the remote function call. A technique similar to the one used for web applications may be used where the internal state of the called function module (or even function group) is serialized and stored using a server side cookie and retrieved again when the function module is called again.

The application 215 may perform background tasks by batch jobs 210-3 in FIG. 2A. In order for them to work smoothly (i.e. to avoid inconsistencies) with the transformed user interface 215-1 and related functional computing logic 215-2, the batch jobs 210-3 may need to be adjusted like the other parts to become batch jobs 215-3. For example, since there may be no session ID for background tasks, an artificial session ID may be created. The artificial session ID may be created by generating a GUID (which is a unique ID) using, for example, a function GUID_CREATE for each task instance. In this context, the GUID may only be generated once, and may be used as the session ID. The GUID allows for consistency handling since it is unique to the session. All transformations may apply to the GUID during the session. This applies not only to batch jobs but also to remote function calls, function new task calls, a business application programming interface (BAPI), and the like. A BAPI may be an interface for providing access to processes and data in business application systems such as R/3.

Since the stateless locking framework 245-1 is not integrated with an ABAP basis it may not be called in case the application may end (either normally or abnormally). Locks remain, for example, because of unforeseen aborts that may occur with computer application 215. Hence, a mechanism is needed to ensure that those locks managed by the stateless locking framework 245-1 are removed which are no longer valid. Similar issues exist for the storage of the stateless update task framework 245-2 and the state storage. A clean-up function 245-4 may check for inactive sessions (sessions that are no longer active but for which locks, update tasks or stored state representations still exist), and may remove invalid locks, update tasks and state representations belonging to session which no longer exist. A batch job running the clean-up function 245-4 may run repeatedly from time to time, e.g. every 15 minutes, and may remove all locks, update tasks and state representations for which no active session exists anymore.

In a specific example, the state information of an ABAP application, functioning as application 215, may include the following information: the user interface interaction state, which may include a current state of user interface controls; and a record of all user issued changes not yet committed to a database. The user issued changes may be stored in application specific data structures and variables. Any other data may be considered supporting data structure. Particular cached data that may be held in the user context for performance reasons is not part of the user state. Instead, it may be re-read with every request. Any variable containing a copy or derived information may also not be part of the user state, and may also be re-read from the database or recomputed when necessary.

In one embodiment, only the state information as listed above need to be stored in state storage and all the supporting data structures are rebuild using the state information each time in phase 1. However, depending on the time required to build up the supporting data structures it may be beneficial to include some or all of the supporting data in the user state. The trade-off of how much of the state information is needed or should be stored may be determined for each application.

FIG. 2B illustrates an exemplary component diagram of a software framework in a server environment for scaling a computer system to a large number of concurrent users according to an exemplary embodiment.

The computer system of FIG. 2B may include, in a stateful condition, the application server 220, which may host computer application 210. However, when transformed, the transformed application 210 may include some additional data and executable code. For example, it may include a transformed user interface (UI) 216-1, transformed functional computing logic 216-2 and unchanged batch jobs 210-3. In addition, an application server 220 may be extended to an extended application server 225, and may include additional software frameworks for stateless consistency handling. In particular, the extended server 225 may include a consistency framework 226 that may include a stateless locking framework 225-1 and a stateless update task framework 225-2.

The UI 216-1 of the transformed application may be stateless, and may include additional functionality provided by additional code that provides state handling similar to the transformed application of FIG. 2A. In addition, the functional computing logic 216-2 of the transformed application 216 may include additional code for state handling similar to the transformed application of FIG. 2A.

The implementation of the consistency framework 226 within, for example, an application server implemented as the extended application server 225 may directly access the user Session ID generated by the UI framework (e.g. the BSP application framework). In addition, for batch jobs, the application server may either generate a unique ID or reuse an internal unique ID like a process ID, e.g. the user context ID in case of an ABAP application server, to identify each batch job. Hence, in each case the consistency framework 226 could access this ID. Therefore, the application server may be able to select an appropriate LUWID, required to call the consistency framework, based on the determination that the coding runs as a user interface task or background job automatically.

An LUW_ID, determined by the application server and required by the consistency framework, may be passed on internally within the application server 225, which is in this example, an ABAP server. As a consequence, further modifications to provide this functionality to the coding of the application 216, for example, the functional computing layer coding and the batch jobs of an ABAP application, may not be required. In other words, the following ABAP statements may be used without any changes to the original application coding: CALL FUNCTION . . . IN UPDATE TASK, PERFORM ON COMMIT, CALL FUNCTION . . . IN BACKGROUND TASK DESTINATION, COMMIT WORK, PERFORM ON COMMIT, PERFORM ON ROLLBACK, ROLLBACK, SET UPDATE TASK LOCAL, ENQUEUE, DEQUEUE and DEQUEUE_ALL.

The two consistency frameworks, stateless lock and update task framework, may be implemented similarly to the ones shown in FIG. 2A. The implementation of stateless lock and update task framework may use lock storage and update tasks storage, respectively. A difference being that a batch job to run the clean-up function cyclically is not needed to remove data for abnormal terminated applications from the different storages. Instead, the application server calls the clean up functionality directly when a session ends (either abnormally or regular). In case the application server itself aborts abnormally, it may terminate all running sessions abnormally, too. Hence, a clean-up function may to be called at startup of the server to remove information belonging to inactive sessions.

A general guideline for structuring the stateless application user context may include limiting the size of the state representation data to be smaller than the user context in the original stateful application (for example, 210 of FIG. 2A). The efficiency of the state management (state storage and user context rebuild) may be optimized if the state is maintained with less data than the user context of the original application. As a result, the state representation may be maintained between requests (dialog steps).

Figure 3:
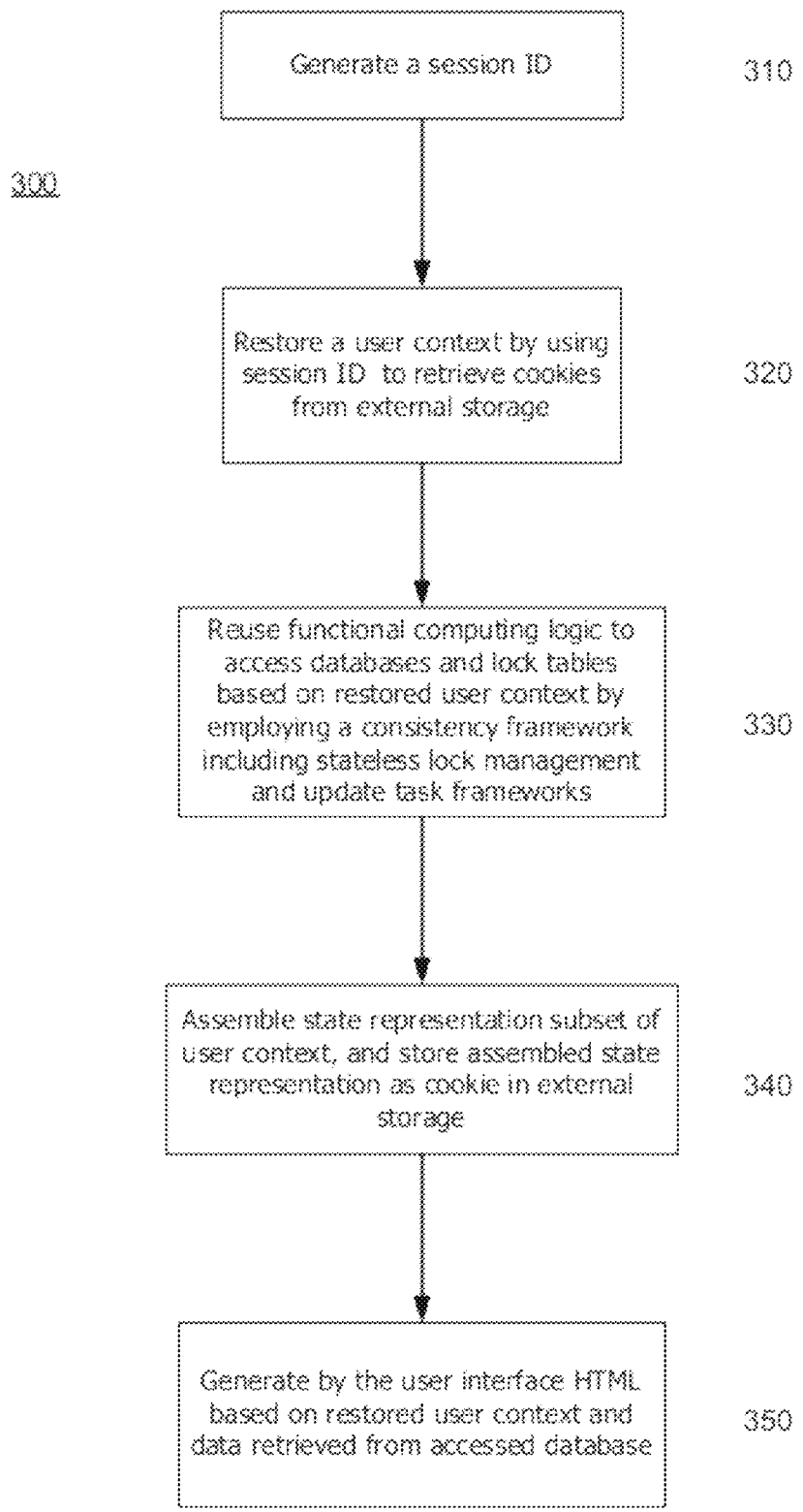
FIG. 3 illustrates an exemplary process in an application environment and a server environment for scaling a computer system to a large number of concurrent users according to an exemplary embodiment.

FIG. 3 illustrates an exemplary process for scaling a computer system to a large number of concurrent users. The process 300 begins in a stateful application in which, at step 310, a session identification (ID) may be generated for the user session. In the case where a large number of users may be accessing a computer application, for example, an accounting program for end of the month reconciliation, a session ID may be generated for each of the plurality of users of the computer application. For example, the session ID may be generated by a business server page framework executing on an application server, and in combination with a UI layer as shown in FIG. 1. At step 320, a user context for each of the plurality of users may be restored by using the respective generated session ID to retrieve cookies from external storage. Using the restored user context, the functional computing logic may be called to provide, for example, requested functions to each of the plurality of users. According to requests from a user interface and based on data, such as permissions and security settings, from the restored user context, the functional computing logic functions, at step 330, may access data in a database, may create/cancel update tasks and may set/reset locks by means of the consistency framework that may include stateless lock management and an update task framework. A state representation subset of a user context may be assembled at step 340. The user context and the assembled state representation may be stored as a cookie in external storage using, for example, the session ID as a primary key. At step 350, HTML code may be generated by, for example, the user interface based on the assembled state representation, user context, and data from the accessed database.

The process 300 may also be applied to an application server embodiment in which as shown in FIG. 2A, the application server 225 may be extended to provide state handling and consistency handling without the application. The extended server 225 may implement the process steps indicated above that are explained as being handled by a computer application. In the case of a server implementation, only changes to state handling of the application coding may be necessary as all state and consistency handling functions are performed by a processor at the server. Accordingly, the above described stateless functionality may be provided to a number of different computer applications at the server level.

Figure 4:
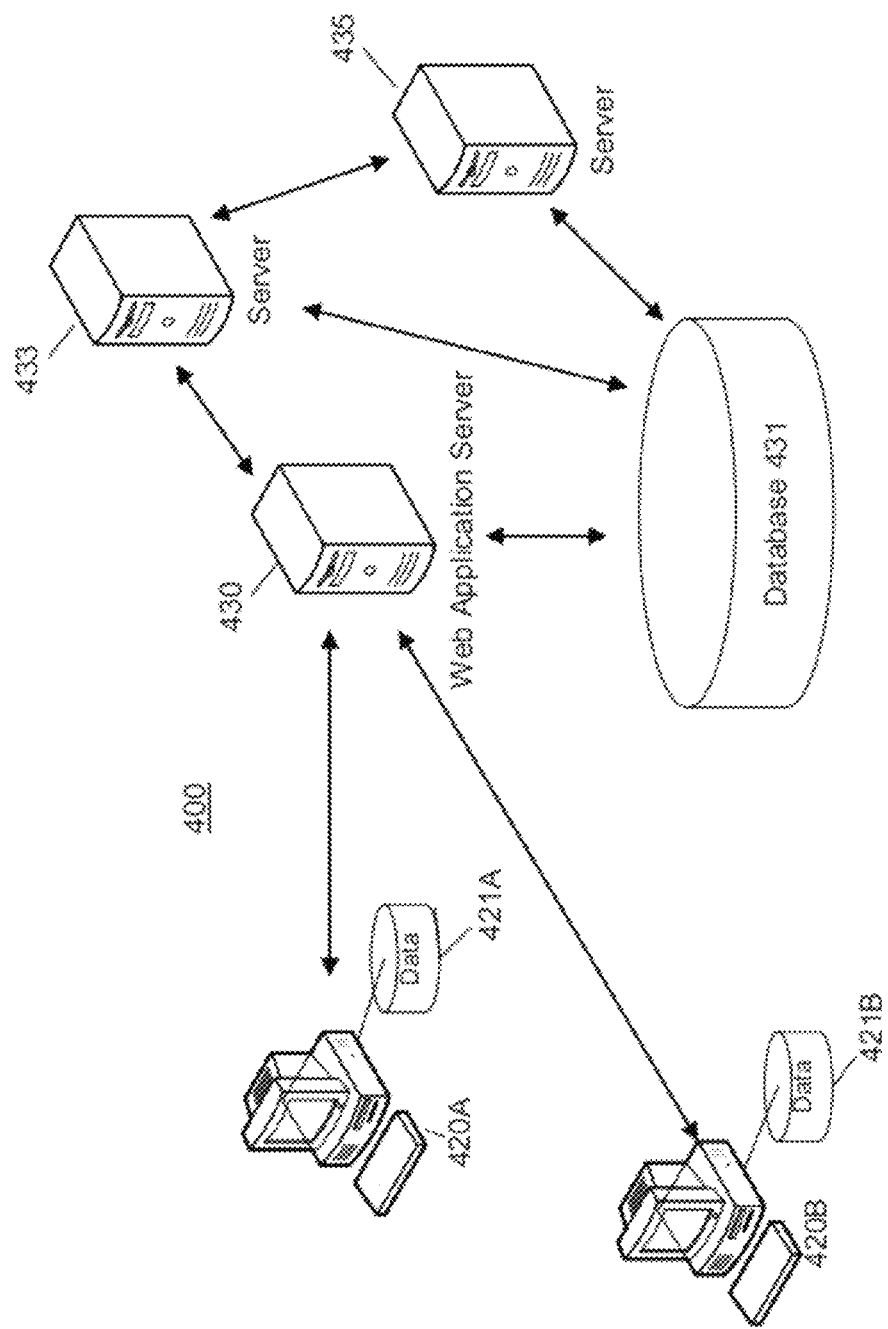
FIG. 4 illustrates a system diagram for implementing a process of scaling a computer system to a large number of concurrent users according to an exemplary embodiment.

An exemplary computer system for implementing a process as described with respect to FIG. 3 is illustrated in FIG. 4. The computer system 400 may comprise terminals 420A and 420B, a web application server 430 and a database 431. The terminals 420A and 420B may have access to respective data storage 421A and 421B. The terminals 420A and 420B may be simply display devices with input capabilities, e.g., keyboard, for presenting a graphical user interface and receiving input. Alternatively, terminals 420A and 420B may contain processors and execute functional computing logic, such as computer applications related to, for example, invoicing and human resources management. Computer application processes may execute on a processor of the web application server 430 and a graphical user interface may render data for presentation on the client terminals 420A and 420B. Alternatively, the graphical user interface and related functionality may be present on the terminals 420A and 420B. The web application server 430 may be in communication with additional servers within a network such as servers 433 and 435. Either or both of the servers 433 and 435 may maintain the above-described lock server and message server, act as a database server or a web application server. Servers 433 and 435 may retrieve and store data in the database 431.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for transforming a stateful computer application to a stateless application to facilitate scaling to a large number of concurrent users of a computer system, comprising:
   generating, by a processor executing a computer application, a session identification (ID) for a user session in the computer system;
   retrieving a server side cookie related to the user session from an external storage in the computer system using the session ID;
   restoring, by the processor, a user context for the user session by using the retrieved server side cookie;
   calling functional computing logic based on the restored user context, wherein execution of the functional computing logic includes accessing an application database, which includes:
   storing each lock for the application database using a respective key that includes a logic unit of work identifier (LUW_ID) and a timestamp;
   implementing a stateless update task framework on an applications server, which further includes:
   queuing and maintaining update statements in a server side update task storage for a duration of the user session;
   executing said statements at a later point in time;
   assembling a state representation subset of the user context according to data in a database;
   upon completion of functions performed by the computer application functional computing logic, storing the user context and the assembled state representation as a server side cookie in the external storage, wherein the session ID is a primary key; and
   generating HTML code by a user interface for the user based on the assembled state representation, user context, and data from the accessed database.

2. The method of claim 1, comprising:
   generating a new session identification for each of a plurality of users of a different computer application while the previous session identification remains active.

3. The method of claim 1, wherein the session identification is generated by a stateful computer application, and the user context is restored by a stateless computer application.

4. The method of claim 3, wherein the stateless computer application is a business page server (BSP) application.

5. A computer system for transforming a stateful computer application to a stateless application to facilitate scaling a computer system to a large number of concurrent users, comprising:
   a terminal for receiving inputs and outputting data;
   a database for storing data; and
   an application server having a processor configured to:
   generate a session identification (ID) for a user session in the computer;
   retrieve a server side cookie related to the user session from an external storage in the computer system using the session ID;
   restore a user context for the user session by using the retrieved server side cookie;
   call functional computing logic based on the restored user context, wherein execution of the functional computing logic includes accessing an application database, which includes:
   storing each lock for the application database using a respective key that includes a logic unit of work identifier (LUW_ID) and a timestamp;
   implementing a stateless update task framework on an applications server, which further includes:
   queuing and maintaining update statements in a server side update task storage for a duration of the user session;
   executing said statements at a later point in time;
   assemble a state representation subset of the user context according to data in a database;

upon completion of functions performed by the functional computing logic, store the user context and the assembled state representation as a server side in the external storage, wherein the session ID is a primary key; and generate HTML code by a user interface based on the assembled state representation, user context, and data from the accessed database.

6. The computer system of claim 5, the processor is further configured to:

generate a new session identification for each of a plurality of users of a different computer application having different functional computing logic while the previous session identification remains active.

7. The computer system of claim 6, wherein the session identification is generated by a stateful computer application, and the user context is restored by a stateless computer application.

8. The computer system of claim 7, wherein the stateless computer application is a business page server application.

9. A non-transitory machine-readable storage medium embodied with program instructions for causing a computer processor to execute a method for scaling a computer system to a large number of concurrent users, the method comprising:

generating a session identification (ID) for a user session in the computer system;

retrieving a server side cookie related to the user session from an external storage using the session ID;

restoring a user context for the user session by using the retrieved server side cookie;

calling functional computing logic based on the restored user context, wherein execution of the functional computing logic includes accessing an application database, which includes:

storing each lock for the application database using a respective key that includes a logic unit of work identifier (LUW_ID) and a timestamp;

implementing a stateless update task framework on an applications server, which further includes:

queuing and maintaining update statements in a server side update task storage for a duration of the user session;

executing said statements at a later point in time;

assembling a state representation subset of the user context according to data in a database;

upon completion of functions performed by the functional computing logic, storing the user context and the assembled state representation as a server side cookie for the user session in the external storage, wherein the session ID is a primary key; and generating HTML code by a user interface for each of the plurality of based on the assembled state representation, user context, and data from the accessed database.

10. The non-transitory machine-readable storage medium of claim 9, the method further comprising:

generating a new session identification for each of a plurality of users of a different computer application having different functional computing logic while the previous session identification remains active.

11. The non-transitory machine-readable storage medium of claim 10, wherein the session identification is generated by a stateful computer application, and the user context is restored by a stateless computer application.

12. The non-transitory machine-readable storage medium of claim 11, wherein the stateless computer application is a business page server application executing on a processor.

13. A method for substituting a stateless implementation for a stateful implementation to provide further functionality to scale a computer application for use by a large number of users, comprising:

generating a computer session identification (ID) in response a request for a computer application, the computer session ID including information related to the computer requesting the computer application;

forming a user context from the information related to the requesting computer;

creating a server side cookie having a state representation of the user context and the computer session ID;

accessing data from a database for execution of the computer application functions, the accessing of the database including:

storing each lock for the application database using a respective key that includes a logic unit of work identifier (LUW_ID) and a timestamp;

implementing a stateless update task framework on an applications server, which further includes:

queuing and maintaining update statements in a server side update task storage for a duration of the user session;

executing said statements at a later point in time;

upon execution of functions related to the computer application, assembling a revised state representation of the user context including the computer session;

upon completion of functions performed by the computer application, revising the server side cookie to include the assembled state representation, wherein the session ID is a primary key for retrieving the server side cookie from an external storage;

storing the revised server side cookie in the external storage; and generating HTML code by a user interface based on the assembled state representation, user context, and data from the accessed database.

14. A system for substituting a stateless implementation for a stateful implementation to provide further functionality to scale a computer application for use by a large number of users, comprising:

a terminal for receiving inputs and outputting data;

a database for storing data; and an application server having a processor configured to:

generate a computer session identification (ID) in response a request for a computer application, the computer session ID including information related to the computer requesting the computer application;

form a user context from the information related to the requesting computer;

create a server side cookie having a state representation of the user context and the computer session ID;

access data from a database for execution of the computer application functions, the accessing of the database including:

storing each lock for the application database using a respective key that includes a logic unit of work identifier (LUW_ID) and a timestamp;

implementing a stateless update task framework on an applications server, which further includes:

queuing and maintaining update statements in a server side update task storage for a duration of the user session;

executing said statements at a later point in time;

upon execution of functions related to the computer application, assemble a revised state representation of the user context including the computer session;

upon completion of functions performed by the computer application, revise the server side cookie to include the assembled state representation, wherein the session ID is a primary key for retrieving the server side cookie from an external storage;

store the revised server side cookie in the external storage; and generate HTML code by a user interface based on the assembled state representation, user context, and data from the accessed database.

15. A non-transitory machine-readable storage medium embodied with program instructions for causing a computer processor to execute a method for scaling a computer system to a large number of concurrent users, the method comprising:

generating a computer session identification (ID) in response a request for a computer application, the computer session ID including information related to the computer requesting the computer application;

forming a user context from the information related to the requesting computer;

creating a server side cookie having a state representation of the user context and the computer session ID;

accessing data from a database for execution of the computer application functions, the accessing of the database including:

storing each lock for the application database using a respective key that includes a logic unit of work identifier (LUW_ID) and a timestamp;

implementing a stateless update task framework on an applications server, which further includes:

queuing and maintaining update statements in a server side update task storage for a duration of the user session;

executing said statements at a later point in time;

upon execution of functions related to the computer application, assembling a revised state representation of the user context including the computer session;

upon completion of functions performed by the computer application, revising the server side cookie to include the assembled state representation, wherein the session ID is a primary key for retrieving the server side cookie from an external storage;

storing the revised server side cookie in the external storage; and generating HTML code by a user interface based on the assembled state representation, user context, and data from the accessed database.

\* \* \* \* \*